United States Patent

Evans, Jr. et al.

[11] Patent Number: 5,988,329
[45] Date of Patent: Nov. 23, 1999

[54] ROTARY DAMPER

[75] Inventors: Charles F. Evans, Jr.; Edwin P. Wnorowski; Robert R. Fowler; Gary M. Rumrill, all of Louisville; Keith E. Dunmire, Pewee Valley, all of Ky.

[73] Assignee: Turn-Act, Inc., Louisville, Ky.

[21] Appl. No.: 08/974,973

[22] Filed: Nov. 20, 1997

[51] Int. Cl.[6] .............................. F16D 57/02; F16F 9/14
[52] U.S. Cl. .......................... 188/296; 188/310; 188/313
[58] Field of Search .................................. 188/306, 307, 188/308, 309, 310, 313, 293, 296

[56] References Cited

U.S. PATENT DOCUMENTS

| | | |
|---|---|---|
| 1,587,207 | 6/1926 | Ackerman . |
| 1,903,377 | 4/1933 | Moorhouse . |
| 1,920,273 | 8/1933 | Peo . |
| 1,957,997 | 5/1934 | Fieldman . |
| 2,070,413 | 2/1937 | Sandberg . |
| 2,369,008 | 2/1945 | Beecher . |
| 3,003,595 | 10/1961 | Patriquin . |
| 3,062,331 | 11/1962 | Wyman . |
| 3,613,842 | 10/1971 | Buciak . |
| 3,722,638 | 3/1973 | McClure . |
| 3,870,130 | 3/1975 | Miller . |
| 4,588,053 | 5/1986 | Foster . |
| 4,624,346 | 11/1986 | Katz . |
| 4,723,639 | 2/1988 | Hungerford .............................. 188/307 |
| 4,942,947 | 7/1990 | Shtarkman . |
| 5,305,858 | 4/1994 | Haga et al. . |
| 5,664,286 | 9/1997 | Sorimachi ................................ 188/307 |
| 5,720,370 | 2/1998 | Takahashi ................................ 188/310 |
| 5,735,067 | 4/1998 | Isley et al. ............................... 188/307 |

*Primary Examiner*—Robert J. Oberleitner
*Assistant Examiner*—Robert A. Siconolfi
*Attorney, Agent, or Firm*—Camoriano & Associates; Theresa Camoriano

[57] ABSTRACT

A rotary damper includes a housing and a vane. There is an indentation in the housing which permits fluid to flow readily from one side of the vane to the other during part of the rotary stroke. At the end of the rotary stroke, there is an alternative path for fluid to take from one side of the vane to the other, and this path preferably includes an adjustable aperture so the amount of damping at the end of the stroke can be adjusted.

11 Claims, 5 Drawing Sheets

ROTARY DAMPER

BACKGROUND OF THE INVENTION

The present invention relates to a rotary damper, and, in particular, to a rotary damper for damping rotary motion at the end of the stroke.

In some cases of rotary motion, such as when an arm is moving through a vertical arc while carrying a weight, there is a problem with the abrupt stopping of the mechanism at the end of the stroke, which causes an undesirable hammering or jarring of the mechanism. In many cases, the cycling of this rotary motion is very rapid, with cycles in the range of 0.125 to 5 cycles per second, and this hammering at the ends of the stroke can harm the mechanism itself as well as any products that are being carried by the mechanism. Therefore, it would be desirable to have a rotary damper that permits free movement of the mechanism throughout its rotary stroke until the end, where the movement would be damped.

A wide variety of shock absorbers and dampers is known in the art. In the case of rotary dampers, there are dampers which damp the motion along the entire stroke, and there are devices that permit free rotary movement until the end of the stroke, and then provide an abrupt stop at the end of the stroke. Also, it has been known to have a rotary actuator contact mechanical, linear dampers at the ends of its stroke, but this requires multiple mechanisms, which are expensive and which do not work well at high cycle rates. There are not any rotary dampers that permit free rotary movement until the end of the stroke and then provide damping at the end of the stroke.

SUMMARY OF THE INVENTION

The present invention provides a rotary damper that permits free rotary motion throughout the stroke and provides damping only at the end of the stroke.

In addition, the present invention provides an adjustment mechanism by which the amount of damping at the end of the stroke may be adjusted, as desired.

The present invention provides a rotary damper which can operate reliably at high cycle rates in the range of 0.125 to 5 cycles per second.

The present invention provides a rotary damper which is relatively simple and inexpensive.

The mechanism of the present invention includes a housing in which there is a rotary vane. There is a smooth surface against which the rotary vane seals as it moves in rotary motion. There is a groove or indentation in the smooth surface, so that, for part of the stroke of the vane, fluid can readily leak through the groove from one side of the vane to the other, permitting free rotary motion. The ends of the groove are preferably tapered so that the fluid path begins to be restricted near the end of the stroke. As the vane passes the end of the groove, and the fluid can no longer flow from one side of the vane to the other through the groove, it flows through an alternative path. This path includes an adjustable orifice which restricts the flow, thereby providing the damping for the rotary motion at the end of the stroke. For the vane to return, fluid freely backflows through this alternative path without having to pass through the small orifice. Thus, this rotary damper permits free movement through most of the stroke and provides damping at the end of the stroke to prevent jarring or hammering of the mechanism at the end of the stroke.

DESCRIPTION OF THE PREFERRED EMBODIMENTS

FIGS. 1–6 show various views of a combination of a rotary actuator 8 and rotary damper 10, which has been made in accordance with the present invention. While it is preferred to make the actuator and damper together in a unit, as shown here, it is understood that the actuator portion 8 and the damper portion 10, each could be made as a stand-alone, separate unit.

Figure 1:
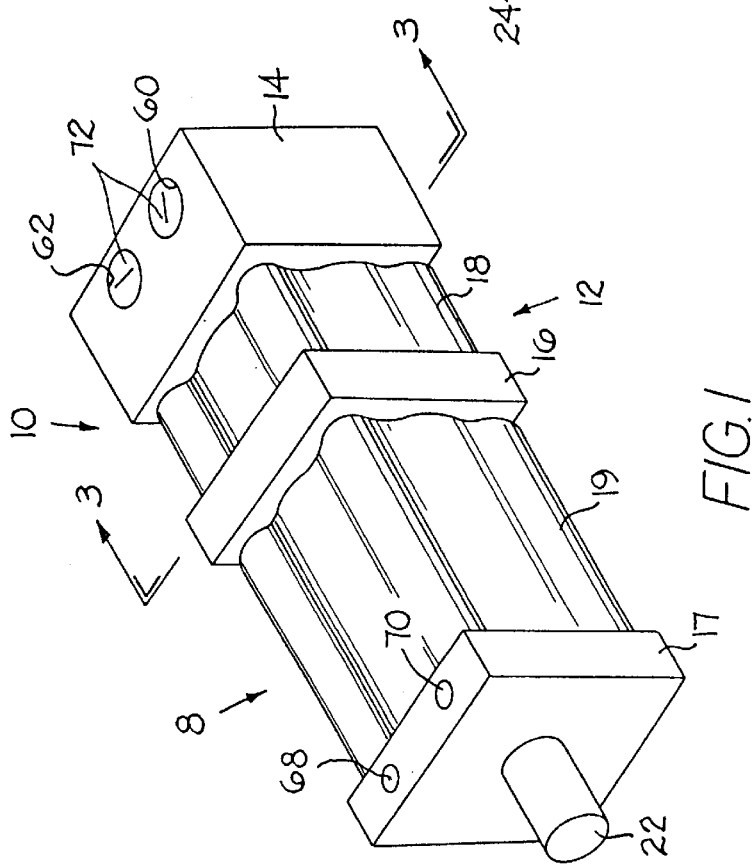
FIG. 1 is a perspective view of a rotary actuator and rotary damper combination made in accordance with the present invention.
Figure 2:
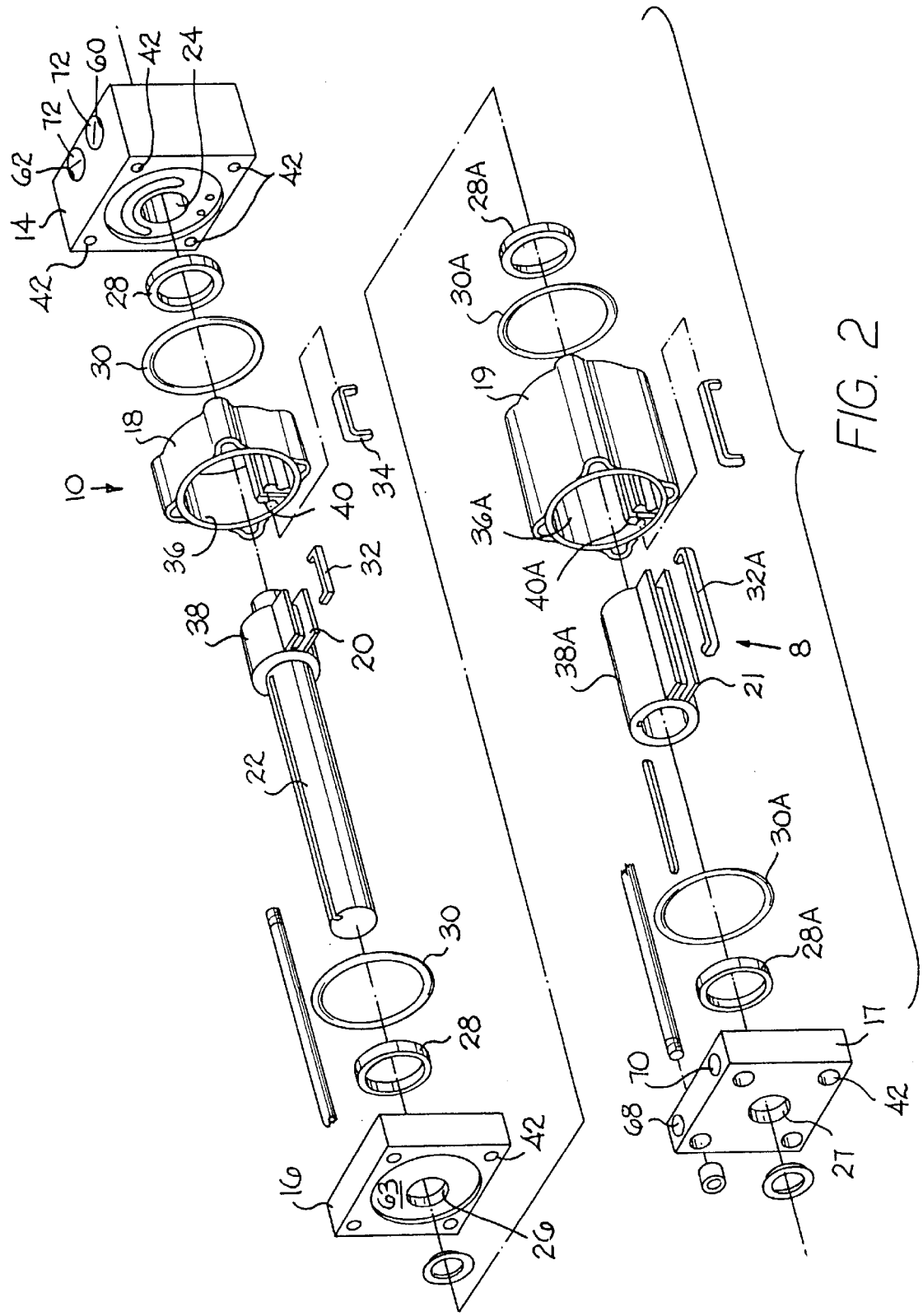
FIG. 2 is an exploded perspective view of the rotary actuator/rotary damper combination of FIG. 1.

Referring now to FIGS. 1 and 2, the combination rotary actuator 8 and rotary damper 10 includes a housing 12, made up of first, second, and third substantially flat end bodies 14, 16, 17, a first cylinder 18 extending between the damper end bodies 14, 16, and a second cylinder 19 extending between the actuator end bodies 16, 17. The actuator 8 and damper 10 share the end body 16, which is identical on both sides.

A damper vane 20 and an actuator vane 21 are mounted coaxially inside the housing 12 on the same shaft 22. The rotary damper vane 20 is mounted between the first and second end bodies 14, 16, and the rotary actuator vane 21 is mounted between the second and third end bodies 16, 17. The shaft 22 extends from a recess 24 in the first end body 14, through the damper vane 20, through a hole 26 in the second end body 16, through the actuator vane 21, and through a hole 27 in the third end body 17. The free end of the shaft 22, projecting out the end body 17, is intended to be connected to an arm or other load, which will be rotated back and forth by the rotary actuator 8, while the damper 10 will prevent jarring of the mechanism and load at the ends of the stroke. The damper vane 20 and actuator vane 21 are keyed to the shaft 22, pinned or pressed onto the shaft 22, or otherwise mounted on the shaft so they cannot rotate relative to the shaft 22. A plurality of seals 28, 30, 32, 34 is provided inside the housing 12 to create left and right chambers in the rotary damper 10 and left and right chambers in the rotary actuator 8. The left and right chambers in the damper 10 and actuator 8 are separated by their respective vanes 20, 21.

The seals 28 seal between the ends of the cylindrical base 38 of the damper vane 20 and the first and second ends 14, 16 of the housing 12. The seals 28A seal between the ends of the cylindrical base 38A of the actuator vane 21 and the second and third ends 16, 17 of the housing 12. The seals 30 seal between the ends of the cylinder 18 and the first and second ends 14, 16 of the housing 12. The seals 30A similarly seal between the ends of the cylinder 19 and the second and third ends 16, 17 of the housing 12. The seal 32 seals between the damper vane 20 and the smooth inside surface 36 of the cylinder 18 and between the ends of the damper vane 20 and the ends 14, 16 of the damper housing. The seal 32A similarly seals between the actuator vane 21 and the smooth inside surface 36A of the cylinder 19 and between the ends of the vane 21 and the ends 16, 17 of the actuator housing. The seal 34 seals between the cylindrical base 38 of the damper vane 20 and a projection 40 in the cylinder 18 and between the ends of the projection 40 and the first and second end bodies 14, 16. The seal 34A similarly seals between the cylindrical base 38A of the actuator vane 21 and a projection 40A in the cylinder 19 and between the ends of the projection 40A and the second and third end bodies 16, 17. Holes 42 at the four corners of each of the end bodies 14, 16, 17 are used to bolt the whole rotary actuator damper housing 12 together.

FIGS. 3, 4, 4A, 5, 5A, and 6 show the first end body 14. In all these Figures except FIGS. 4A and 5A, the fluid control valves 72 have been removed for clarity. One of the fluid control valves is shown in detail in FIG. 5A. The end body 14 includes a substantially toroidal, flat, smooth surface 44 against which the seal 32 of the damper vane 20 seals as the vane follows an arcuate path. There is an arcuate groove or indentation 48 in the smooth surface 44. The indentation 48 preferably is deeper and wider at the center 50 than at the ends 52, 54, so it has a larger cross-section at the center 50 than at the ends 52, 54. (In another application, it may be desirable to make the indentation 48 have a uniform cross-section throughout its length.) There are also four holes 56, 56A, 58, 58A in the smooth surface 44, with the holes 56, 58 being located near the center 50 of the indentation 48. There are two vertical bores or cavities 60, 62 in the end body 14 behind the smooth surface 44. The first holes 56, 56A extend to the first bore 60, and the second holes 58, 58A extend to the second bore 62. Thus, the first bore 60 provides a fluid path between the hole 56 and the hole 56A, and the second bore 62 provides a fluid path between the hole 58 and the hole 58A.

Figure 5A:
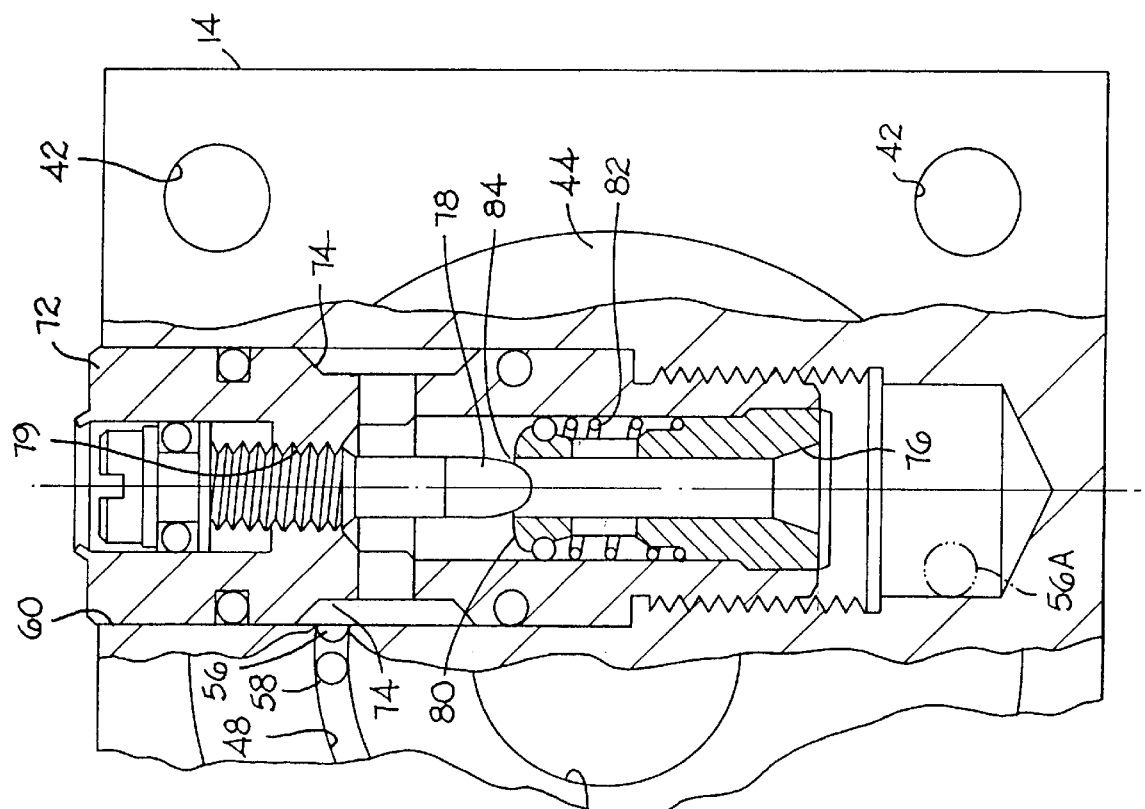
FIG. 5A is the same view as FIG. 5 but enlarged and showing the fluid control valve in the valve cavity.
Figure 5:
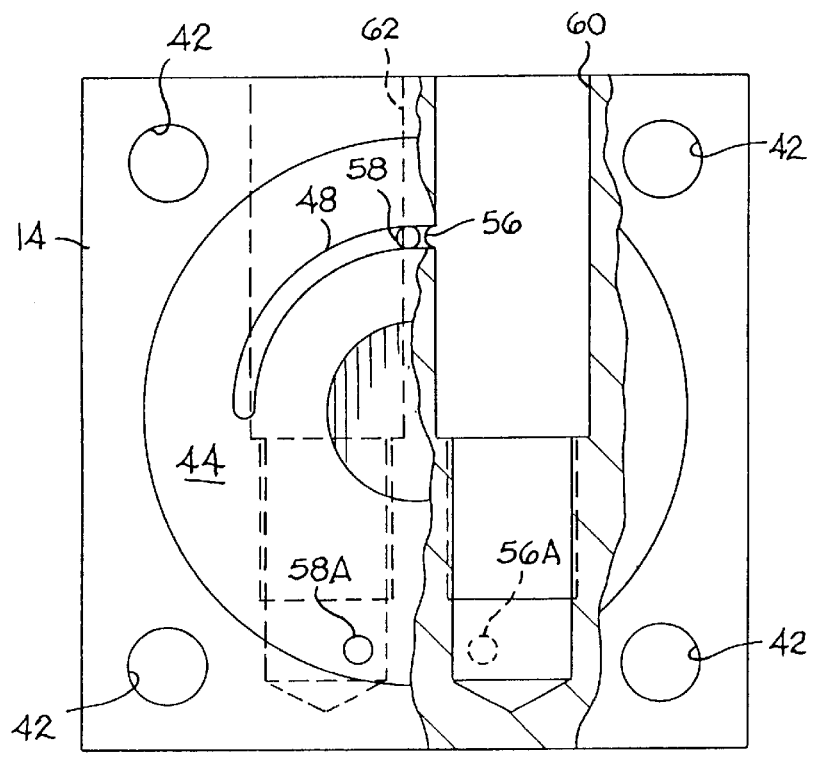
FIG. 5 is the same view as FIG. 4 but partially in section to show one of the valve cavities.
Figure 6:
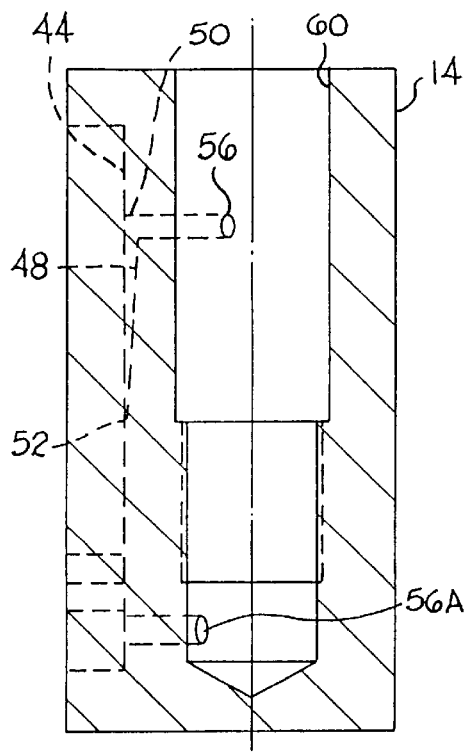
FIG. 6 is a view taken along the section 6-6 of FIG. 4, showing the same valve cavity shown in FIG. 5.
Figure 4A:
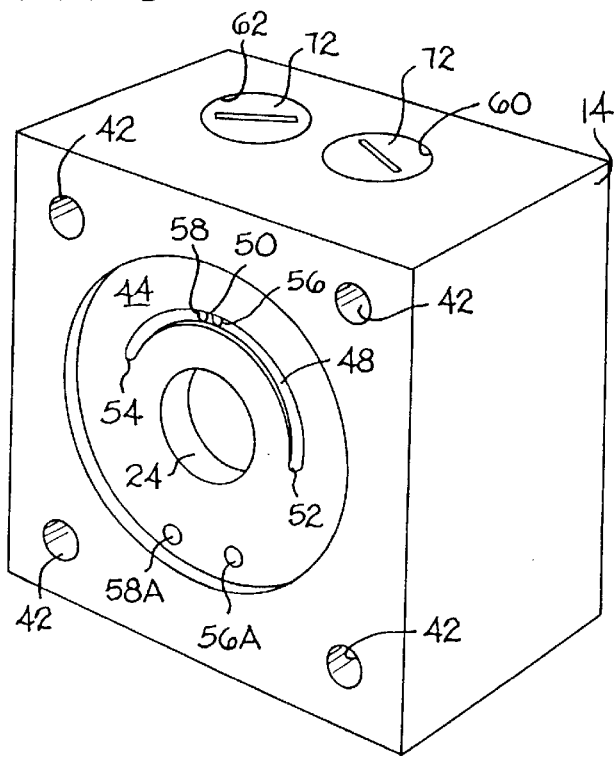
FIG. 4A is a perspective view of the end of the housing shown in FIG. 4.

FIGS. 5 and 6 show the bore 60, the smooth, toroidal surface 44, and the groove 48, which is deeper at the center 50 than at the end 54. They also show that the holes 56 and 56A extend into the bore 60.

Referring again to FIG. 2, it can be seen that the second end body 16 has a toroidal recess 63 on the side facing the actuator 8. It has an identical toroidal recess (not shown) on the opposite side, facing the damper 10. The third end body 17 has the same type of toroidal recess (not shown) on the side facing the actuator 8. These toroidal recesses 63 provide smooth faces against which the vanes 20, 21 are sealed as they rotate. The third end body 17 also has two ports 68, 70, which, in operation, are connected to hoses (not shown), which provide air or some other working fluid to cause the actuator 8 to rotate back and forth. The functioning of the actuator 8 will not be described in detail herein, because it is very well known in the art.

FIG. 5A shows the valve 72, which is located in the valve bore 60. It is identical to the valve 72 located in the valve bore 62. This valve 72 is an off-the-shelf fluid control valve, and many different types of fluid control valves are known and could be used in the present invention. The valve 72 includes an upper port 74, a lower port 76, a tapered needle 78, and a spring-loaded movable head 80. An aperture 84 is defined between the tip of the tapered needle 78 and the movable head 80. When fluid flows down from the upper port 74, it pushes the movable head 80 down against the spring 82, creating a large aperture 84 through which the fluid can readily pass to go out the lower port 76. When fluid flows up from the lower port 76, it must flow past the small aperture 84 to go out the upper port 74. The size of the small aperture 84 is adjustable by screwing the needle 78 up and down in the threads 79.

Figure 3:
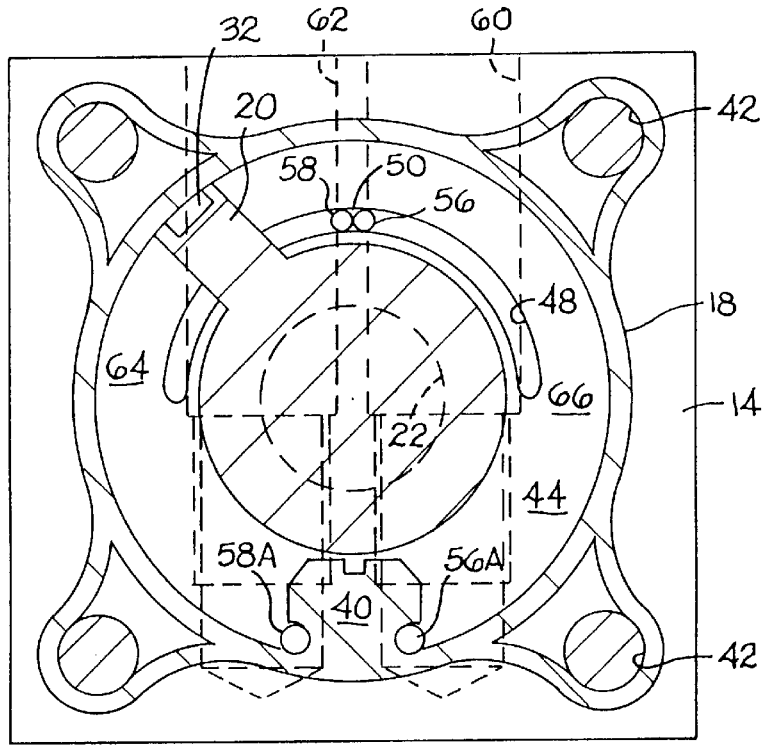
FIG. 3 is a view taken along the section 3-3 of FIG. 1.
Figure 4:
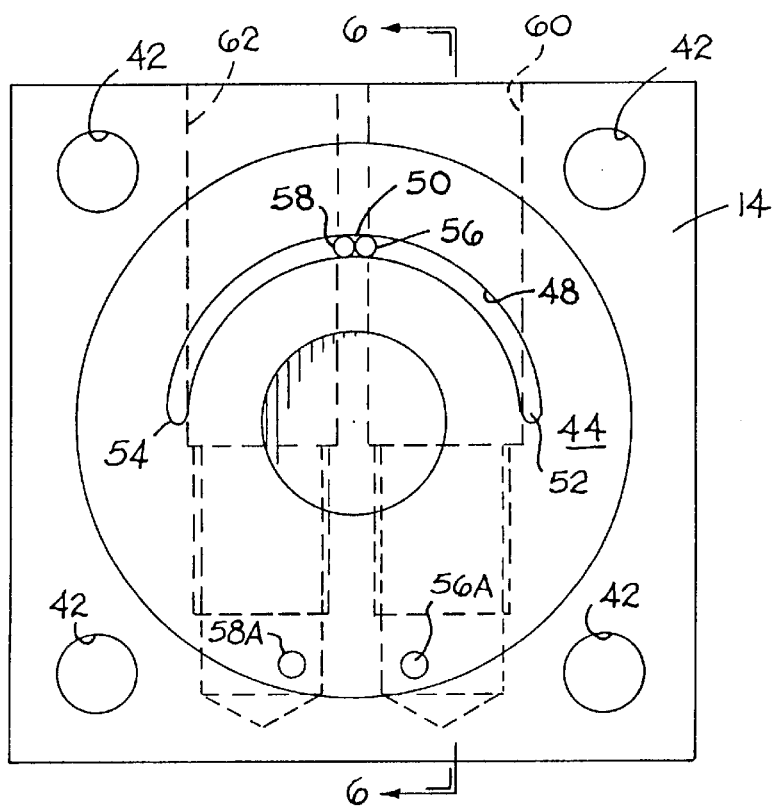
FIG. 4 is a view of the inside of one end of the housing of the rotary damper of FIG. 1.

FIG. 3 shows the damper vane 20, as it is rotating inside the housing 12. In the counterclockwise direction, the damper vane 20 can rotate until it reaches the left side of the stop 40, and, in the clockwise direction, the damper vane 20 can rotate until it reaches the right side of the stop 40. The situation is the same in the actuator 8, and the actuator vane 21 is mounted so as to be aligned with the damper vane 20, so that the two vanes 20, 21 are in the same angular position at the same time. The damper vane 20 defines a first chamber 64 and a second chamber 66. There is a substantially incompressible fluid, such as water or, preferably, hydraulic fluid, filling both of the chambers 64, 66. The first and second chambers 64, 66 are sealed, and there is no need to provide additional working fluid to the damper 10.

FIGS. 7–10 are schematic drawings, which show how the damper 10 operates during clockwise and counterclockwise strokes. When the damper vane 20 is in the position shown in FIG. 7, and the shaft is rotating in the clockwise direction, the fluid must move from the right chamber 66 to the left chamber 64 in order for the damper vane 20 to be able to rotate clockwise. Since the vane 20 is past the left end of the groove 48, the only way fluid can move from the right chamber 66 to the left chamber 64 is by flowing in the hole 58, through the valve bore 62, through the valve 72, and out the hole 58A. As was explained above, the valve 72 permits free flow in the downward direction, so fluid can readily flow from the hole 58 to the hole 58A, and there will be no damping as the vane 20 moves in this part of the stroke.

Figure 8:
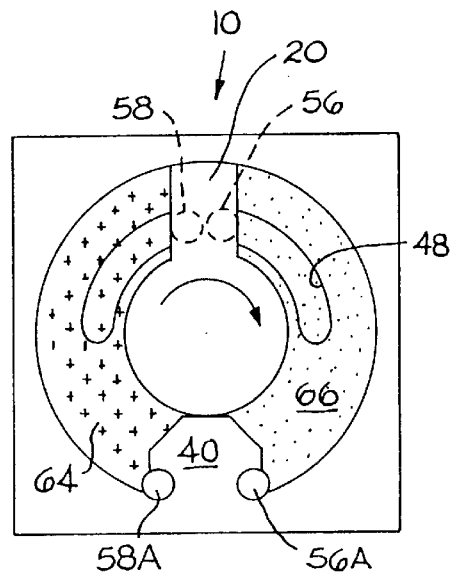
FIG. 8 is the same view as FIG. 7 but showing the damper vane progressing in the clockwise direction.

Once the vane 20 reaches the indentation 48, as shown in FIG. 8, fluid can readily flow from the right chamber 66 to the left chamber 64 through the indentation 48, so again there is no damping as the vane 20 moves in this part of the stroke.

Figure 9:
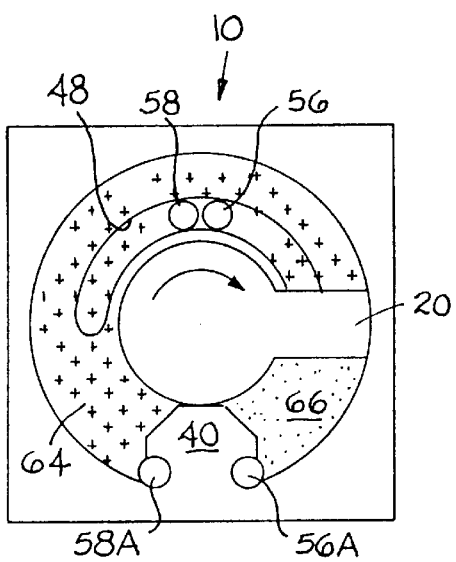
FIG. 9 is the same view as FIG. 7 but showing the damper vane reaching the end of its stroke in the clockwise direction.

When the vane goes past the right end of the indentation 48, as shown in FIG. 9, the fluid can no longer flow from the right chamber 66 to the left chamber 64 through the groove 48, so, the only way the vane 20 can continue to rotate clockwise is by fluid passing from the right chamber 66, into the hole 56A, through the bore 60 and past the valve 72, and out the hole 56 to the left chamber 64. As was explained above, when fluid is travelling upwardly through the valve 72, it must flow past a small aperture in order to get through. This creates a back pressure, which creates the desired damping effect at the end of the clockwise stroke.

Figure 10:
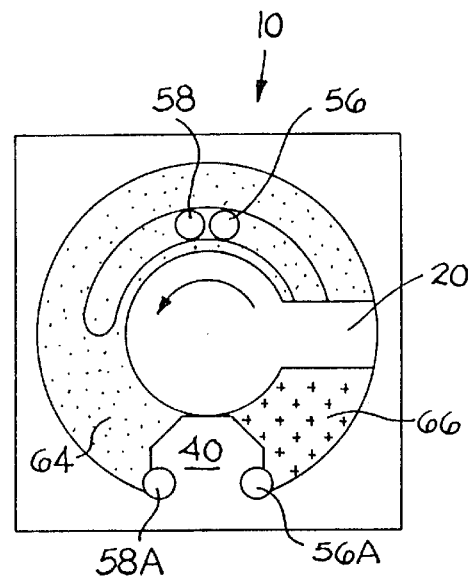
FIG. 10 shows the same view as FIG. 7 but with the damper vane rotating counter-clockwise.

When the shaft begins to rotate back in the counterclockwise direction, as shown in FIG. 10, fluid must flow from the left chamber 64, into the hole 56, through the bore 60, past the valve 72, and out the hole 56A into the right chamber 66. Again, as was explained above, fluid can flow freely in the downward direction, so there is no damping in this part of the stroke. Once the vane 20 reaches the groove 48, fluid flows freely from the left chamber 64 to the right chamber 66 through the groove 48.

Figure 7:
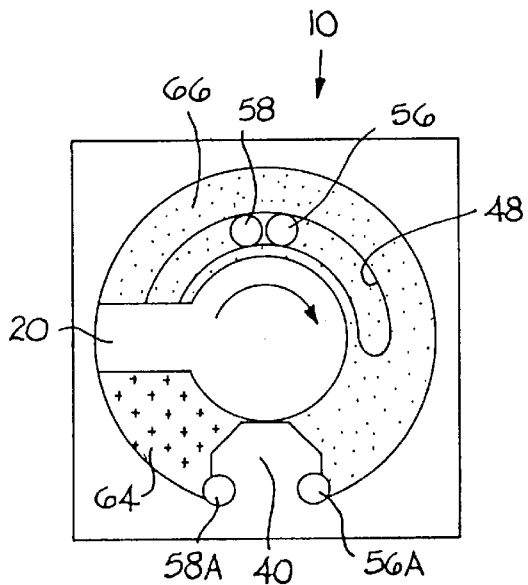
FIG. 7 is a schematic view of the rotary damper of FIG. 1 as the damper vane begins rotating clockwise.

The next time damping will occur is as the vane 20 passes the left end of the groove 48, at the position shown in FIG. 7. In order for the vane 20 to move any further in the counterclockwise direction, fluid must flow from the left chamber 64, into the hole 58A, through the left bore 62, past the valve 72, and out the hole 58 into the right chamber 66. Since the fluid must flow past a small aperture 84 in order to flow in that direction, there is again damping at the left end of the counter-clockwise stroke. Then, the process repeats as the shaft causes the vane 20 to move back and forth in the rotary damper 10.

So, the rotary actuator portion 8 drives the shaft 22 back and forth to move an arm or other load (not shown) connected to the free end of the shaft 22, and the rotary damper portion 10 dampens the motion at the ends of the stroke to prevent jarring and damaging of the mechanism and of the load carried by the mechanism.

While the holes and groove have been shown to be in the end body of the damper, it would be possible to put them elsewhere and achieve the same effect. Also, while all the pathways are shown in the end body, they could be defined by hoses or other pathways. While the type of flow regulator valves that were used in the present embodiment required two sets of holes, it would be possible to achieve the same result with a single pair of holes with other valving that would permit fluid to flow freely or to flow past an aperture at the desired times.

It will be obvious to those skilled in the art that modifications may be made to the embodiment described above without departing from the scope of the present invention.

What is claimed is:

1. A rotary damper, comprising:
    a housing, defining a smooth surface;
    a vane rotatable in said housing through arcuate clockwise and counterclockwise strokes, said vane defining first and second chambers within said housing;
    a seal between said vane and said smooth surface;
    first and second holes in said housing; and a path connecting said first and second holes, so that fluid can flow between said first and second chambers through said holes and said path;
    a small orifice in said path through which fluid must pass when flowing in one direction between said first and second chambers through said path; and
    an indentation in said smooth surface which permits fluid to flow between the first and second chambers through said indentation for part of each stroke; such that, during a portion of each stroke, fluid flows between said first and second chambers through said indentation, and, during another portion of at least one of the strokes, flow through said indentation is restricted so that a primary flow path is through said orifice.

2. A rotary actuator as recited in claim 1, and further comprising a fluid control valve in said path, said fluid control valve including said orifice.

3. A rotary damper as recited in claim 2, wherein said indentation defines a center portion and two end portions, and wherein the cross-section of said center portion is larger than the cross-section of said end portions, so that fluid flows more freely through said indentation when said vane is located over said center portion than when said vane is located over one of said end portions.

4. A rotary damper as recited in claim 1, and further comprising a second set of holes and a second path; and a second orifice in said second path.

5. A rotary damper as recited in claim 2, wherein said valve includes a mechanism to adjust the size of the orifice.

6. A rotary damper as recited in claim 1, in combination with a rotary actuator, comprising a shaft, and an actuator vane mounted on the shaft, and wherein the vane of the damper is also mounted on the shaft, and the actuator and damper share an end wall.

7. A rotary damper as recited in claim 1, wherein said damper includes first and second end walls, and wherein said indentation is in one of said end walls.

8. A rotary damper as recited in claim 7, wherein said holes are located in said one end wall.

9. A method of damping rotary motion, comprising the steps of:
    providing a housing, and a rotating vane inside said housing defining first and second chambers and defining clockwise and counterclockwise arcuate strokes;
    filling said first and second chambers with fluid; and
    permitting the fluid to flow freely between said first and second chambers during a first portion of each stroke and restricting the flow of fluid between said first and second chambers during a second portion of each stroke so as to provide damping during the second portion of each stroke.

10. A rotary damper, comprising:
    a housing, including first and second ends and a cylinder connecting said first and second ends together;
    a shaft extending between said first and second ends and projecting out through one of said ends;
    a vane mounted on said shaft, fixed relative to said shaft, and rotatable in said housing as said shaft rotates, said vane defining first and second chambers within said housing and defining clockwise and counterclockwise arcuate strokes;
    an indentation in said first end, which permits fluid to flow between the first and second chambers for part of each of said strokes of said vane;
    first and second holes in said housing; a fluid path between said first and second holes; and an orifice in said fluid path, which provides resistance to the flow of fluid between said first and second chambers for part of at least one of the strokes of said vane.

11. A rotary damper as recited in claim 10, wherein said orifice provides resistance to the flow of fluid only in one direction.

* * * * *